(No Model.) 2 Sheets—Sheet 2.
A. C. FISH.
Brake-Lever.
No. 226,508. Patented April 13, 1880.
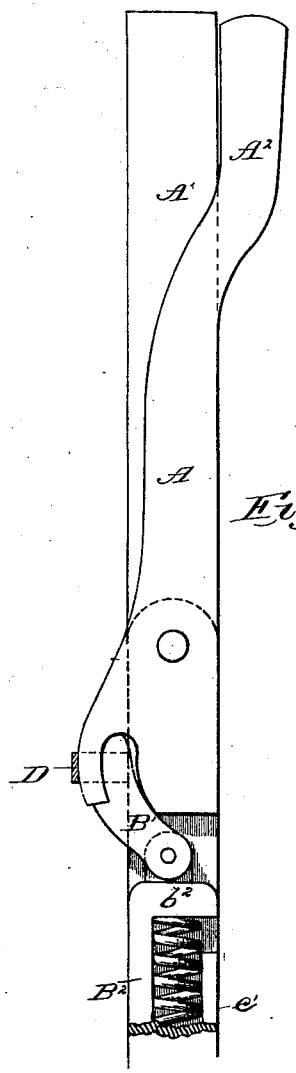
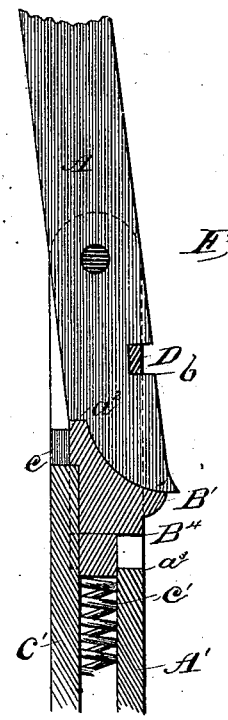
Witnesses:
C. L. Asmus
Charles F. Hunter
Inventor:
Abner C. Fish
Judd & Stint
Attorney.

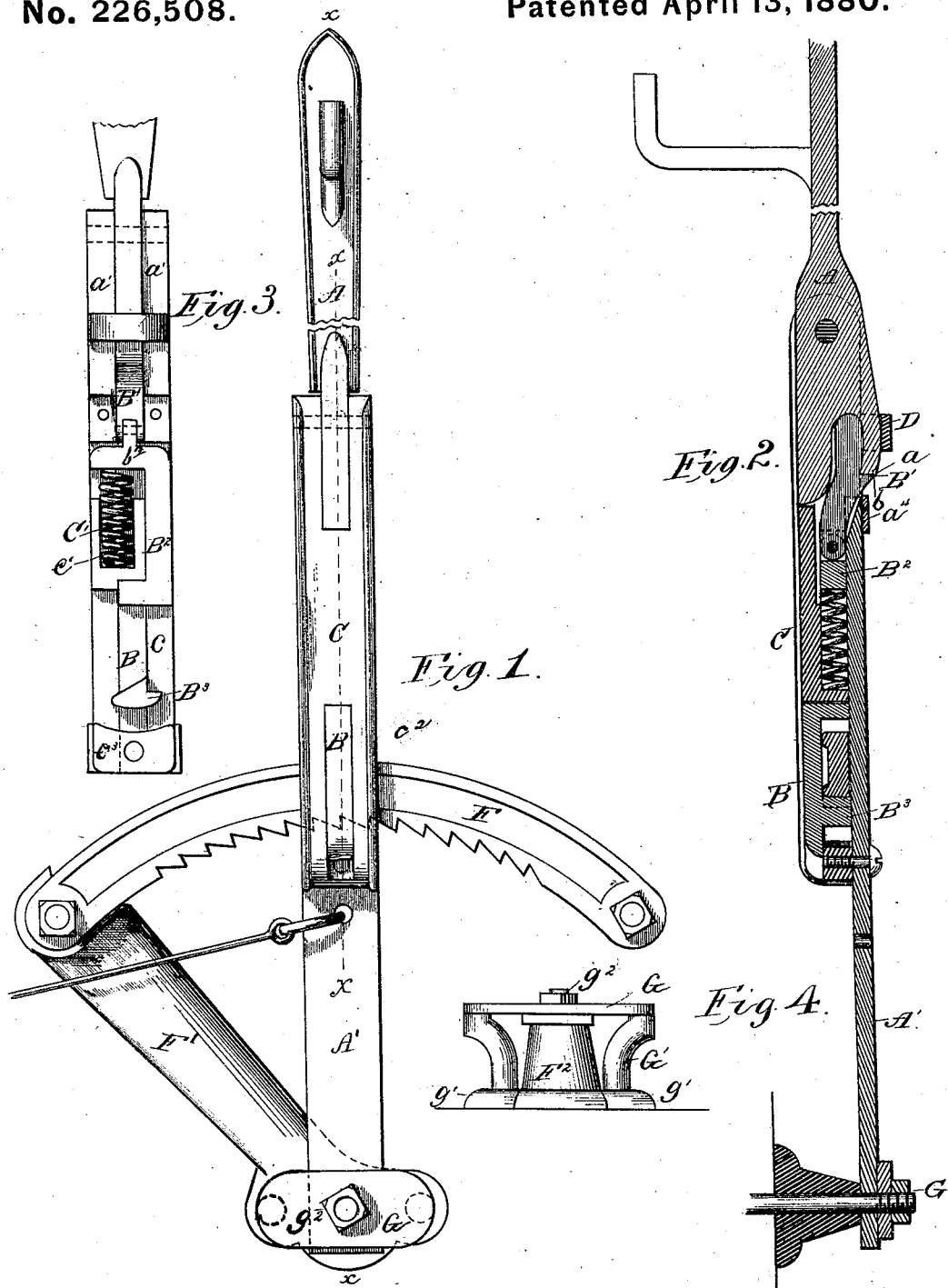

UNITED STATES PATENT OFFICE.

ABNER C. FISH, OF RACINE, WISCONSIN.

BRAKE-LEVER.

SPECIFICATION forming part of Letters Patent No. 226,508, dated April 13, 1880.

Application filed March 3, 1880. (No model.)

*To all whom it may concern:*

Be it known that I, ABNER C. FISH, of Racine, in the county of Racine, and in the State of Wisconsin, have invented certain new and useful Improvements in Brake-Levers; and I do hereby declare that the following is a full, clear, and exact description thereof.

My invention relates to wagon-brake levers; and it consists in the device hereinafter described and claimed.

In the drawings, Figure 1 is a side view of my invention; Fig. 2, a vertical section on line $x\ x$, Fig. 1; Fig. 3, a detached view of the dog and its attachments; Fig. 4, a detail; and Figs. 5 and 6 illustrate modifications.

My invention involves the use of two levers, A A'. The lower lever, A', is provided with a hole, through which the pivoting-bolt is passed, and is attached to a face-plate, C, which has flanges or bifurcations to receive the hinged tongue B' of the dog B, as well as the lower end of lever A. B is a dog, which has a hinged tongue, B', projecting up from it, an offset, $B^2$, and a catch, $B^3$.

Face-plate C has a socket, C', for containing the operating-spring $c'$, a vertical slot, $c^2$, to accommodate the lower portion of the dog, and a lug, $c^3$, by which it is attached to the section A', and a socket, $a^4$, for the upper end of lever A'.

The tongue B' is shouldered at $b$, and fits loosely in the lower end of lever A, which is bifurcated for that purpose, a squared portion, $a$, on one arm resting upon the shoulder $b$ of the tongue.

A bar, D, limits the play of the lower end of lever A in one direction, while that in the opposite direction is limited by the flange $b^2$ of the dog coming in contact with the top of the spring-socket C' and the under side of the catch $B^3$ abutting against the lug $c^3$. The ratchet F passes between the offset $B^2$ and the catch, its teeth projecting from its under side.

In the modification shown in Fig. 4 I have the lever A' continued up to within easy reach of the driver, and the lever A pivoted to it, so as to have a motion parallel to that of the lever $a'$ when operating the brakes. The lever A is also bent near its top, so as to have a projecting handle, $A^2$. Therefore, to release the catch both levers must be grasped and lever-handle $A^2$ squeezed into line with lever A', while to operate my device as shown in Figs. 1 and 2 the handle of lever A must be drawn toward the body.

The modification shown in Fig. 5 contemplates the substitution for the hinged tongue of a dog-head concaved to receive the lower end of lever A, which has a corresponding termination to depress the dog by a cam instead of a link motion.

The lower end of the face-plate may be provided with side pieces cast with it, for grasping lever A' on both sides and preventing any vibration at that point.

I provide the rack F with an arm, F', which projects down and terminates in a perforated lug, $F^2$. Upon this I place the perforated end of lever A, and over the whole I place a staple, G, having legs, which, passing through the ears of the arm F', rest upon the body. The pivoting-bolt $g$ is now passed through the staple-lever A' and lug $F^2$ into the body. By this means the lever A', in its constant working back and forward, will be prevented from working the nut $g^2$ loose, as all of the abrasion will come on the under side of the staple G.

My device is applicable to both hand and foot brakes, and the parts may be all cast except the spring, and may be quickly put together by unskilled labor.

What I claim as my invention, and desire to secure by Letters Patent, is—

1. The combination, with levers A A', of face-plate C, slotted at $c^2$, and having spring-socket, as described, with the dog having flange $b^2$ and offset $B^2$, as set forth.

2. The combination of face-plate C, having socket $a^4$ and lug $c^3$, perforated as described, with the dog and levers A A', as set forth.

3. The combination of face-plate C, constructed as described, with the dog having hinged tongue and the levers A A', as set forth.

4. The combination of lever A, bar D, lever A', and face-plate C with the dog B, having tongue B', offset $B^2$, and catch $B^3$, as set forth.

5. The dog having hinged tongue B', in combination with a lever, A, for operating it, and the lever A', for applying the power.

In testimony that I claim the foregoing I have hereunto set my hand this 26th day of February, 1880.

ABNER C. FISH.

Witnesses:
 E. H. BOTTUM,
 S. S. STOUT.